United States Patent
Sabate Vizcarra et al.

(10) Patent No.: US 9,975,119 B2
(45) Date of Patent: May 22, 2018

(54) FUEL CELL AND ANALYSIS DEVICE THAT COMPRISE IT

(71) Applicant: CONSEJO SUPERIOR DE INVESTIGACIONES CIENTIFICAS (CSIC), Madrid (ES)

(72) Inventors: Maria de les Neus Sabate Vizcarra, Cerdanyola del Valles Barcelona (ES); Juan Pablo Esquivel Bojorquez, Cerdanyola del Valles Barcelona (ES)

( * ) Notice: Subject to any disclaimer, the term of this patent is extended or adjusted under 35 U.S.C. 154(b) by 132 days.

(21) Appl. No.: 14/409,897

(22) PCT Filed: Jun. 19, 2013

(86) PCT No.: PCT/EP2013/062718
§ 371 (c)(1),
(2) Date: Dec. 19, 2014

(87) PCT Pub. No.: WO2013/189973
PCT Pub. Date: Dec. 27, 2013

(65) Prior Publication Data
US 2015/0202621 A1    Jul. 23, 2015

(30) Foreign Application Priority Data
Jun. 20, 2012 (ES) .................................. 201230960

(51) Int. Cl.
*B01L 3/00* (2006.01)
*H01M 8/1009* (2016.01)
(Continued)

(52) U.S. Cl.
CPC ....... *B01L 3/5027* (2013.01); *B01L 3/502707* (2013.01); *G01J 1/0403* (2013.01);
(Continued)

(58) Field of Classification Search
CPC ............. B01L 3/5027; H01M 8/04201; H01M 8/04216; H01M 8/1009; H01M 8/1289; H01M 8/22; H01M 8/1233
See application file for complete search history.

(56) References Cited

U.S. PATENT DOCUMENTS

| 2003/0013046 A1 | 1/2003 | Fonash et al. |
| 2004/0089357 A1* | 5/2004 | Dube ................ B01L 3/502707 137/884 |

(Continued)

FOREIGN PATENT DOCUMENTS

| EP | 2360114 A1 | 8/2011 |
| JP | 2003287515 A | 10/2003 |

(Continued)

OTHER PUBLICATIONS

Juan P. Esquivel et al., "Fuel cell-powered microfluidic platform for lab-on-a-chip applications", The Royal Society of Chemistry 12, Lab Chip, 2012, 12, 74-79.*

(Continued)

*Primary Examiner* — Ula C Ruddock
*Assistant Examiner* — Thomas H. Parsons
(74) *Attorney, Agent, or Firm* — Ferraiuoli LLC; Eugenio J. Torres-Oyola; Victor M. Rodriguez-Reyes

(57) ABSTRACT

A fuel cell comprising: at least one microfluidic channel that allows the capillary flow and, preferably, also diffusion of at least one suitable fluid for generating electricity, at least one receiving absorbent region coupled to each microfluidic channel, at least one collecting absorbent region coupled to each microfluidic channel, a cathodic zone coupled to each microfluidic channel, and an anodic zone coupled to each microfluidic channel, where each receiving absorbent region and each collecting absorbent region are coupled to one of the microfluidic channels such that when a fluid suitable for generating electricity is deposited in the receiving absorbent (Continued)

region, it flows by capillary action through the microfluidic channel to reach the collecting absorbent region where it is absorbed. As well as an analysis device comprising one or more of these fuel cells.

14 Claims, 3 Drawing Sheets

(51) Int. Cl.
*H01M 8/1286* (2016.01)
*H01M 8/16* (2006.01)
*H01M 8/22* (2006.01)
*H01M 8/04082* (2016.01)
*G01J 1/04* (2006.01)

(52) U.S. Cl.
CPC ... *H01M 8/04201* (2013.01); *H01M 8/04216* (2013.01); *H01M 8/1009* (2013.01); *H01M 8/1286* (2013.01); *H01M 8/16* (2013.01); *H01M 8/22* (2013.01); *B01L 2300/0645* (2013.01); *B01L 2300/0816* (2013.01); *B01L 2300/0867* (2013.01); *B01L 2300/126* (2013.01); *Y02E 60/527* (2013.01)

(56) References Cited

U.S. PATENT DOCUMENTS

| | | | |
|---|---|---|---|
| 2005/0084737 A1* | 4/2005 | Wine | H01M 8/04186 429/447 |
| 2006/0183015 A1 | 8/2006 | Tseng | |
| 2007/0178009 A1* | 8/2007 | Sakaino | A61B 5/1411 422/400 |
| 2009/0092882 A1* | 4/2009 | Kjeang | H01M 4/8605 429/506 |
| 2011/0111517 A1 | 5/2011 | Siegel et al. | |
| 2012/0288961 A1* | 11/2012 | Yager | B01L 3/5023 436/501 |

FOREIGN PATENT DOCUMENTS

WO 2009/121041 A2 10/2009
WO 2011/087813 A2 7/2011

OTHER PUBLICATIONS

David R Ballerini et al., "Patterned paper and alternative materials as substrates for low-cost microfluid diagnostics," Microfluid Nanofluid, Review Paper, May 22, 2012, 19 pgs.*
Allen J. Bard, Second Edition Electrochemical Methods Fundamentals and Applications.
D.K. Yang, Fundamentals of Liquid Crystal Devices, Liquid Crystal Physics.
C. G. Granqvist, Electrochromic devices, Journal of the European Ceramic Society 25 (2005) 2907-2912.
David R. Ballerini, Patterned paper and alternative materials as substrates for low-cost microfluidic diagnostics, Microfluid Nanofluid DOI 10.1007/s10404-012-0999-2.
Juan Pablo Esquivel, Fuel cell-powered microfluidic platform for lab-on-a-chip applications, Lab Chip, 2012, 12, 74.
Self-Powered CMOS Front-end Architecture, Biomedical Integrated Instrumentation, pp. 100-114.

* cited by examiner

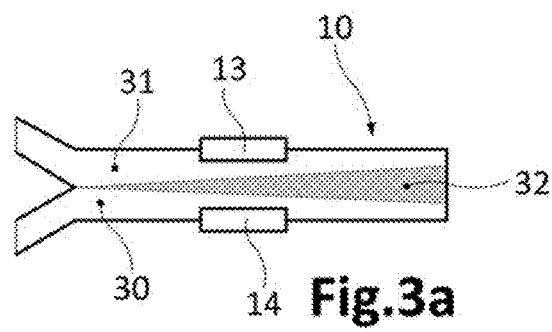
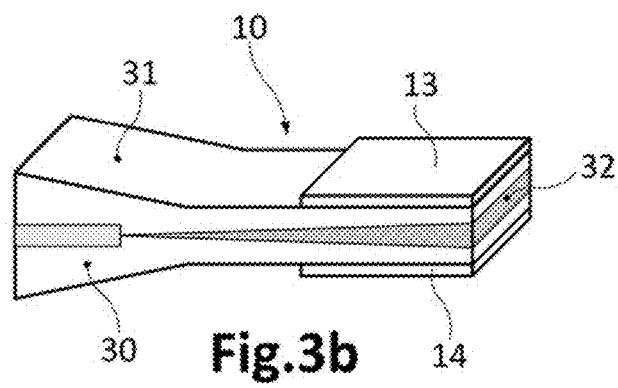
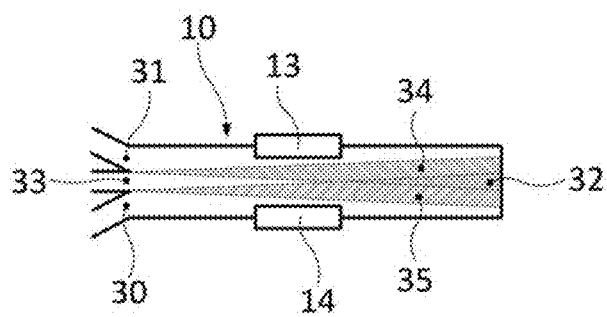

FUEL CELL AND ANALYSIS DEVICE THAT COMPRISE IT

The present invention relates to a fuel cell that can be used for supplying power within an analysis device, preferably a lateral flow test strip, more preferably autonomous.

STATE OF THE ART

A fuel cell is a device that converts chemical energy of a fuel into electrical energy, said conversion takes place as long as the fuel is supplied to the cell. These devices have been developed for more than a decade and have recently begun to find opportunities in, for example, medical applications.

Fuel cells differ from conventional batteries in that the fuel cells allow the continuous replenishment of the consumed reagents, i.e. producing electricity from an external source of fuel and oxygen as opposed to the limited capacity of energy storage which has a battery. In addition, the electrodes in a battery react and change according to how it is loaded or unloaded, whereas in a fuel cell electrodes are catalytic and relatively stable. Moreover, conventional batteries consume solid reactants, and once depleted, must be discarded or recharged with electricity. Generally, in a fuel cell the reagent(s) flow inwardly and the reaction products flow outwardly. This flow of reactant(s) is normally achieved by using, for example, external pumps, which may result in a complex and expensive configuration of the fuel cell.

For instance, U.S. 2009092882 A1 (Kjeang E. et al.) discloses a microfluidic fuel cell architecture with flow through the electrodes. The anode and cathode electrodes are porous and comprise a network of interstitial pores. A virtual insulator is located between the electrodes, in an electrolyte channel. The virtual insulator consists of a co-laminar flow of an electrolyte. An inlet directs substantially all the flow of the liquid reactant through the porous electrode. This configuration has the disadvantage of requiring means, e.g. an external pump, to provide the liquid reagent through the inlet for the fuel cell to operate.

Very recently, it has been disclosed that the integration of a micro direct methanol fuel cell can provide both pumping and electrical power to a microfluidics platform successfully [J P Esquivel, et al., *Fuel cell powered microfluidic platform for lab on a chip applications, Lab on a Chip* (2011) 12, 74-79]. The electrochemical reactions that take place in the fuel cell produce $CO_2$, which is normally considered a residue without any utility. In this case, however, the $CO_2$ is accumulated and used for pumping a fluid into the microfluidic platform. Therefore, the pumping of a fluid, which may be a reagent of a fuel cell, is achieved without need for an external pump, but it is necessary to use a methanol fuel cell for this purpose. Thus, in this case, also the obtained configuration is complex and expensive. Also, using a first fuel cell to cause a flow of a reagent of a second fuel cell would result in a complex system.

Furthermore, fuel cells known to date may contain significant amounts of non-biodegradable materials, so that these fuel cells eventually resulting in non-biodegradable wastes, not environmentally friendly.

DETAILED DESCRIPTION OF THE INVENTION

In a first aspect, the present invention features a fuel cell comprising at least one microfluidic channel that allows the capillary flow of at least one suitable fluid for generating electricity, at least one receiving absorbent region, at least one collecting absorbent region, one cathodic zone comprising at least one cathode and one anodic zone comprising at least one anode. Each receiving absorbent region, where at least one fluid can be deposited, is coupled to one of the microfluidic channels such that the microfluidic channel can receive from the receiving absorbent region the said fluid or fluids by capillary action. Each collecting absorbent region is coupled to one of the microfluidic channels so that it can receive from that microfluidic channel by capillary the fluid or fluids previously deposited in the receiving absorbent regions coupled to the same microfluidic channel. After receiving this fluid or fluids in the collecting absorbent region, these are absorbed in said region allowing the continuation of the flow by capillary action once the microfluidic channel has become saturated. At least one cathode and at least one anode are coupled to each microfluidic channel so that electrical energy can be generated while at least one suitable fluid for generating electricity flows through the microfluidic channel.

In the present invention the term "suitable fluid to generate electricity" is understood as any fluid comprising at least one oxidizing or reducing substance, so that this fluid can interact with one of the cathodes or anodes to generate electricity. Preferably the fluid is a liquid, although it may contain suspended particles, or be a gas or a gel.

In addition to the appropriate flow to generate electricity, the fuel cell of the present invention can also incorporate at least one electrolytic fluid in one of the receiving regions coupled to at least one microfluidic channel. Preferably, this electrolytic fluid is placed in a receiving region different from the one(s) used to deposit any of the suitable fluids to generate electricity.

In preferred embodiments, the present invention relates to the fuel cell wherein any one of the microfluidic channel also allows the diffusion of at least one suitable fluid for generating electricity. In this preferred embodiments the microfluidic channel may allow the capillarity and/or diffusion of such fluid from the receiving region to the microfluidic channel.

The fuel cell of the present invention has the advantage that the flow of suitable fluids for generating electricity, i.e. the flow of reactants is achieved by capillary action and/or diffusion, eliminating the need of, for example, pumps or other means to flow these reactants. In this regard, one of the key points of the fuel cell described in this patent application is that absorption by the collecting absorbent region causes the continuation of the flow by capillary action once the microfluidic channel has become saturated. The fuel cell of the present invention is very simple and can be very cheap, since the microfluidic channel and the absorbent regions may be manufactured from materials that are abundant, cheap and biodegradable such as, for example, fiber and cellulose-based materials such as paper.

Each of the microfluidic channels mainly comprises a wicking material with adequate porosity to allow the flow of at least one fluid capable of generating electricity, this fluid being initially deposited on one of the receiving absorbent regions. Preferably, each of the microfluidic channels within the fuel cell may majorly comprise a material selected independently from the group consisting of hydrophilic polymer, textile fiber, glass fiber, cellulose and nitrocellulose; being especially preferred that such material is biodegradable.

In some even more preferred embodiments, the fuel cell of the present invention comprises at least one microfluidic channel that can be made of paper, such as, for example, filter paper, tissue paper, cellulose paper or writing paper. As mentioned before, this type of material contributes significantly to make the fuel cell biodegradable.

In other preferred embodiments, the present invention relates to the fuel cell that may comprise at least one receiving absorbent region and at least one collecting absorbent region as described in this patent application, where each of the receiving and collecting absorbent regions, independently, may comprise a material selected from the group consisting of hydrophilic polymer, fiber such as textile or glass fiber, cellulose such as paper and nitrocellulose; being especially preferable that such material is biodegradable.

Preferably, the fuel cell of the present invention may comprise at least one microfluidic channel, and each microfluidic channel may comprise at least one receiving absorbent region and at least one collecting absorbent region as described in this patent application, where the microfluidic channels and the receiving and collecting zones coupled to each of them may comprise a material selected independently from the group consisting of hydrophilic polymer, textile fiber, glass fiber, cellulose and nitrocellulose; being especially preferred that all microfluidic channels and receiving and collecting areas coupled to them mostly comprise biodegradable materials.

In other even more preferred embodiments, the fuel cell of the present invention comprises at least one receiving absorbent region, at least one collecting absorbent region and all of them can be made of paper, such as, for example, filter paper, tissue paper, cellulose paper or writing paper. Again, this type of material for absorbent regions also contributes significantly to make the fuel cell very biodegradable.

In either embodiment of the present invention, any cathode and any anode coupled to each of the microfluidic channels may comprise a material mainly selected from the group consisting of noble metal, non-noble metal, enzymes and bacteria. In case that any one of the electrodes comprises enzymes or bacteria, the pH of the medium can be acidic, basic or neutral depending upon the stability of these enzymes or bacteria at different pH. Preferably, the pH of the medium is one in which the metals, enzymes or bacteria present in any one of the electrodes have a higher stability and catalytic activity. To obtain this optimum pH is possible to immobilize suitable substances within the fuel cell.

In other preferred embodiments, the present invention relates to a fuel cell as described in this patent application, where at least one of the electrodes coupled to each microfluidic channel, either the cathode or the anode, may comprise at least one enzymatic catalyst or one metal-based catalyst such as platinum, silver, ruthenium, gold, tin, palladium or cobalt. In a more preferred embodiment, each microfluidic channel comprises an anode and a cathode, and only one of these two comprises an enzymatic catalyst. Preferably, the enzyme catalyst may be selected from the group consisting of glucose oxidase, glucose dehydrogenase, aldehyde dehydrogenase, fructose dehydrogenase, laccase, urease and microperoxidase. This feature also contributes significantly to make the fuel cell of the present invention biodegradable, since the enzymes are biological molecules.

In other preferred embodiments, the present invention also relates to a fuel cell as described in this patent application, wherein each microfluidic channel has coupled a cathodic zone comprising at least one cathode and this may have a porous structure to receive and interact with oxygen from the atmosphere. This feature can help to obtain a more efficient oxidation of the fuel substance(s) and therefore an improved efficiency of the fuel cell.

As mentioned above, the fuel cell of the present invention may comprise more than one microfluidic channel, thereby generating a larger amount of energy. Additionally, the fuel cell of the present invention may comprise a single microfluidic channel, which leads to a device with greater simplicity.

The fuel cell of the present invention may comprise more than one receiving absorbent region coupled to each microfluidic channel, in which case the different receiving absorbent regions can be totally independent or they may be separated regions and located on the same physical support, also called sub-regions in this patent application.

In other preferred embodiments, the receiving and collecting absorbent regions can be located at different heights, which facilitates the flow by capillary action through the microfluidic channel.

Additionally, in other preferred embodiments of the present invention, at least one of the receiving absorbent regions may comprise at least one solid or gelatinous substance selected from the group consisting of oxidizing, reducing and electrolyte. This (these) substance(s) are solubilized when they are in contact with a liquid, preferably aqueous, leading to the movement of this fluid by capillarity or diffusion through the microfluidic channel.

In other preferred embodiments, the fuel cell of the present invention may comprise a single microfluidic channel that allows the capillary flow of at least one suitable fluid for generating electricity. Preferably, the microfluidic channel also allows the diffusion of such fluid from the receiving absorbent region to the microfluidic channel.

In other preferred embodiments, the fuel cell of the present invention may comprise a maximum of three receiving absorbent regions separated from each other, each coupled to the microfluidic channel. Preferably, the fuel cell comprises a single microfluidic channel. Preferably, the microfluidic channel also allows the diffusion of such fluid from the receiving absorbent region to the microfluidic channel.

In even more preferred embodiments, the fuel cell of the present invention may comprise two receiving absorbent regions separated from each other, preferably located in the same physical support, where in the receiving absorbent region closest to the cathode can be placed one or more catholyte fluids, so that the cathode(s) can fully interact with the fluid when it flows through the microfluidic channel by capillary action. Analogously, in the receiving absorbent region closest to the anode zone may be deposited one or more anolyte fluids, so that the anode(s) can fully interact with the anolyte fluid when flowing through the channel microfluidic by capillary action. An especially preferred embodiment of this embodiment is described below (see FIG. 1b).

The catholyte fluid may comprise one or more oxidant substances, preferably the oxidant substances can be selected from oxygen and oxygen-rich compounds such as hydrogen peroxide, manganese oxide or potassium chlorate. Preferably, the catholyte fluid is dissolved oxygen.

Furthermore, the anolyte fluid may include one or more substances selected from the group consisting of methanol, ethanol, formic acid, glucose, glycerol and urea.

The embodiments of the previous paragraph allow obtaining energy in a more efficient way, since they may permit a "clean" oxidizing process and a "clean" reduction process substantially isolated from each other.

In other still more preferred embodiments, the fuel cell of the present invention comprises a third receiving absorbent region, between the two mentioned above, and separated from the other two receiving absorbents regions, preferably all located on the same support, where in this third receiving absorbent region can be deposited at least one electrolyte fluid, so that this electrolyte fluid can at least partially maintain separated the catholyte and anolyte fluids when flowing through the microfluidic channel by capillary action. An especially preferred embodiment is described below (see FIG. 1c).

The electrolyte fluid may comprise one or more substances selected from the group consisting of sulfuric acid, sodium sulfate, phosphate buffered saline, potassium hydroxide and sodium hydroxide.

The embodiments of the previous paragraphs enable the production of energy even more efficiently, since the flow of the electrolyte fluid may delay the mixing of catholyte and anolyte fluids, obtaining a further isolation of oxidation and reduction processes that lead to electrical energy in the fuel cell of the invention.

In a second aspect, the present invention provides an analysis device comprising:

i) at least one fuel cell such as described in this patent application, ii) at least one analysis microfluidic channel that allows the capillary flow of a liquid sample, iii) at least one receiving absorbent region coupled to each analysis microfluidic channel, and iv) at least one collecting absorbent region coupled to each analysis microfluidic channel, where each receiving absorbent region and each collecting absorbent region are connected to an analysis microfluidic channel so that when the liquid sample is deposited in the receiving absorbent region, it flows by capillary action through the analysis microfluidic channel to reach the collecting absorbent region where it is absorbed.

Preferably, the analysis device as described in the present invention may be an analysis test strip, more preferably may be a test strip known as "lateral flow test strip".

In preferred embodiments, the present invention provides an analysis device, preferably a test strip, as described in this patent application that may comprise at least one conductive track connecting any one of the fuel cells within the test device with at least one element selected from the group consisting of at least one electrochemical or optical sensor, at least one display system to visualize the results of the analysis and at least one electronic circuit.

Preferably, when the analysis device is connected to more than one of the foregoing, these can also be linked together by conductive tracks.

The additional features mentioned in the preceding paragraphs may be external to the test device, in which case to use the analysis device of the present invention, it will connect to at least one electrochemical or optical sensor, to at least one display system and to at least one electronic circuit.

In other preferred embodiments, the analysis device, which preferably is the test strip as described in this patent application may further comprise at least one electrochemical or optical sensor coupled to each analysis microfluidic channel, so that each of these sensors can interact in combination with appropriate electrical input signals, with the liquid sample as it flows by capillary action through the analysis microfluidic channel, and such interaction produces electrical output signals representing the result of the test. The test device can also comprise at least one conductive track connecting at least one of the electrochemical or optical sensors coupled to each analysis microfluidic channel with at least one fuel cell. According to these preferred embodiments, the analysis device can be used without connecting it to external electrochemical sensors or external power sources.

In further preferred embodiments, the analysis device of the present invention may comprise at least one display system to visualize the results and at least one conductive track connecting at least one of the display systems with at least one fuel cell comprised in the analysis device. Preferably, the analysis device also comprises at least one electrochemical or optical sensor coupled to each analysis microfluidic channel, and at least one conductive track connecting at least one of these electrochemical or optical sensors with at least one of the fuel cells within the analysis device. Additionally, the analysis device of the present invention may also comprise at least one conductive track connecting at least one of the display systems with at least one of the electrochemical sensors comprised within the device.

In further preferred embodiments, the analysis device of the present invention may comprise at least one electronic circuit and at least one conductive track connecting at least one of the electronic circuits with at least one of the fuel cells comprised within the analysis device. Preferably, the analysis device also comprises at least one electrochemical or optical sensor coupled to each analysis microfluidic channel and at least one conductive track connecting at least one of these electrochemical or optical sensors with at least one of the fuel cells included in the analysis device. Additionally, the analysis device of the present invention may also comprise at least one conductive track connecting at least one of the electronic circuits with at least one of the electrochemical or optical sensors comprised within the device.

In other preferred embodiments, the analysis device as described in this patent application may comprise:

i) at least one fuel cell as the described in this patent application, ii) at least one analysis microfluidic channel that allows the capillary flow of a liquid sample, iii) at least one receiving absorbent region coupled to each analysis microfluidic channel, iv) at least one collecting absorbent region coupled to each analysis microfluidic channel, v) at least one electrochemical or optical sensor connected to each analysis microfluidic channel, vi) at least one display system to visualize the results of the analysis, vii) at least one electronic circuit, and viii) a plurality of conductive tracks connecting each one of them at least two of the elements included in the analysis device and selected from the group consisting of at least one of the electronic circuits, at least one of the fuel cells, at least one of the electrochemical or optical sensors and at least one of the display systems to visualize the results. Preferably, the analysis microfluidic channel also allows the diffusion of the liquid sample.

The network of conductive tracks may be such that the electronic circuit can receive electricity from one of the fuel cells, provide each of the electrochemical or optical sensors suitable electrical input signals, obtain electrical signals output from each of the electrochemical sensors, and provide one of the display systems with the electrical output signals representing the results of the analysis.

The present invention provides an analysis device, preferably a lateral flow test strip, where the flow of appropriate fluid to generate electricity and the liquid sample to be tested can be achieved by capillary without external means, such as for example specific pumps or similar means which can result in complex and expensive configurations. Furthermore, this analysis device may be completely autonomous or independent through the integration of at least one fuel cell as described in this patent application with other suitable means, such as electrochemical sensors, electronic circuits and display systems, which can be powered with the energy from the fuel cell.

In some preferred embodiments, the analysis device of the present invention comprises only one analysis microfluidic channel.

In other preferred embodiments, the test strip as described in this patent application may comprise:
  i) a fuel cell such as described in this patent application,
  ii) an analysis microfluidic channel that allows the capillary flow of a liquid sample,
  iii) a maximum of three receiving absorbent regions coupled to the analysis microfluidic channel,
  iv) a collecting absorbent region coupled to the analysis microfluidic channel,
  v) an electrochemical or optical sensor connected to the analysis microfluidic channel,
  vi) a display system to visualize the results of the analysis,
  vii) an electronic circuit, and
  viii) a plurality of conductive tracks connecting each one of them at least two of the elements included in the test strip and selected from the group consisting of the electronic circuit, the fuel cell, the electrochemical or optical sensor and the system to display results. Preferably, the analysis microfluidic channel also allows the diffusion of the liquid sample.

In other preferred embodiments of the present invention, the receiving and collecting absorbent regions coupled to each analysis microfluidic channel are made of paper, fiber or nitrocellulose based materials, this feature contributes to the biodegradability of the analysis device of the present invention.

In other preferred embodiments, the receiving absorbent regions coupled to each analysis microfluidic channel can be comprised, independently, in one of the receiving absorbent regions comprised in one of the fuel cells.

In other preferred embodiments, the collecting absorbent regions coupled to each analysis microfluidic channel can be comprised, independently, in one of the collecting absorbent regions comprised in one of the fuel cells. Preferably, each of the receiving absorbent regions coupled to each analysis microfluidic channel can be comprised, independently, in one of the receiving absorbent regions comprised in the same fuel cell.

In even more preferred embodiments, the analysis device as described in this patent application may comprise a single fuel cell, a single analysis microfluidic channel, at least one receiving absorbent region coupled to the analysis microfluidic channel and a collecting absorbent region coupled to the analysis microfluidic channel, where the different receiving absorbent regions may be comprised, independently, in any one of the receiving absorbent regions comprised in the fuel cell.

These preferred embodiments allow simultaneously depositing the liquid sample, preferably biological sample such as blood, urine, sweat, saliva, tears, sperm, milk, juice, alcoholic drinks, water, in a receiving absorbent region coupled to a microfluidic channel comprised in the fuel cell and in a receiving absorbent region coupled to the analysis microfluidic channel. In this way, the same sample to analyze can also act as fuel or reagent to produce electrical energy.

Each of the analysis microfluidic channels mainly comprises a wicking material with adequate porosity to allow the flow of liquid sample initially deposited on one of the receiving absorbent regions. Preferably, the test strip of the present invention comprises at least one analysis microfluidic channel which in turn comprises a material selected from the group consisting of hydrophilic polymer, glass fiber, cellulose and nitrocellulose.

In some even more preferred embodiments, the analysis device of the present invention comprises at least one analysis microfluidic channel that can be made of paper. As mentioned before, this type of material contributes significantly to make the analysis device biodegradable, especially when the elements of the fuel cell are also made of paper.

In other embodiments of the invention, each electrochemical sensor of the analysis device may be based on carbon electrodes. This type of material for the electrochemical sensors also contributes significantly to make the analysis device of the invention more biodegradable.

In other embodiments of the invention, the electronic circuit of analysis device may be a silicon-based microelectronic circuit. Additionally, the display system may be a screen, more preferably a screen printed on paper.

In other embodiments of the invention, at least one of the conductive tracks of the analysis device may be made of carbon. This type of material for the conductive tracks can make the analysis device highly biodegradable.

A very important advantage of some of the embodiments described in this patent application is that a fuel cell and a test strip comprising a fuel cell as described in this patent application, may have very small dimensions. This is possible thanks to the simple structure that the fuel cell and the test strip may have, on the type of materials that can be used to produce such a simple configuration. Another advantage is that both the fuel cell as the preferred test strip described in this patent application can have a very high level of biodegradability.

BRIEF DESCRIPTION OF THE FIGURES

Preferred embodiments of the present invention are described in the following nonlimiting examples, with reference to the accompanying figures, in which:

FIG. 3a: Schematic representation of catholyte and anolyte fluids flowing through a microfluidic channel as shown in FIG. 1b.

FIG. 3b: Schematic representation of a 3D configuration of a microfluidic channel and coupled cathodic and anodic zones, through which catholyte and anolyte fluids flow in accordance with preferred embodiments of the invention.

FIG. 3c: Schematic representation of catholyte, anolyte and electrolyte fluids flowing through a microfluidic channel as shown in FIG. 1c.

DETAILED DESCRIPTION OF EMBODIMENTS OF THE INVENTION

Figure 1A:
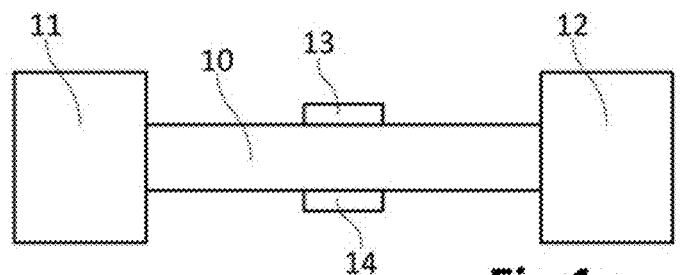
FIG. 1a: Schematic representation of a top view of a fuel cell according to a first preferred embodiment of the invention.

FIG. 1a shows a schematic representation of a top view of a fuel cell according to a first particularly preferred embodiment of the invention. This fuel cell comprising a microfluidic channel (10), a receiving absorbent region (11) coupled to the microfluidic channel (10) at one end of said microfluidic channel (10), and a collecting absorbent region (12) coupled to the microfluidic channel (10) at the opposite end of said channel. In order to facilitate capillary action through the microfluidic channel, it is preferred that the end which is coupled to the collecting absorbent region (12) and the end to which is coupled the receiving absorbent region (11) are located at different heights, remain indifferent which end is higher.

This particularly preferred configuration of the fuel cell of the present invention allows to deposit in the receiving absorbent region (11) at least one suitable fluid for electricity generation, i.e. a fluid comprising fuel reactants. As well as allowing the flow of these fluids by capillary action through the microfluidic channel (10), until reaching the collecting absorbent region (12) where fluids are absorbed, thereby allowing the continued flow through the microfluidic channel (10).

The fuel cell of FIG. 1a also comprises a cathodic zone comprising at least one cathode (13) and an anodic zone comprising at least one anode (14) coupled to the microfluidic channel (10) so that the cathodic zone (13) and the anodic zone (14) can generate electrochemical energy due to its interaction with at least one fluid comprising fuel reactants when these flow continuously through the microfluidic channel (10) by capillary action. In this embodiment, the fluid deposited in the single receiving absorbent region may comprise reducing and oxidizing species, such that the interaction of the cathodic zone (13) with the reducing species and interaction of the anodic zone (14) with the oxidizing species may lead to an electrochemical voltage between the cathodic zone (13) and the anodic zone (14). In this particular embodiment, the cathodic zone (13) is placed on a lateral side of the microfluidic channel (10), and the anodic zone (14) is placed on the opposite side of the microfluidic channel (10).

Still referring to FIG. 1a, the receiving absorbent region (11) may comprise at least one chemical substance which has been previously immobilized in a defined area of the receiving absorbent region (11), so that the substance can be dissolved by adding an external liquid, preferably an aqueous liquid.

Figure 1B:
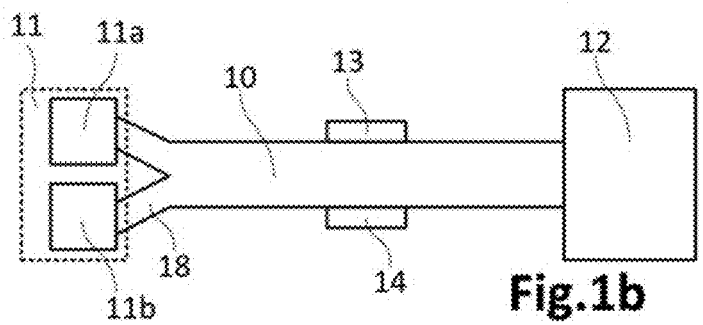
FIG. 1b: Schematic representation of a top view of a fuel cell according to a second preferred embodiment of the invention.

FIG. 1b is a schematic representation of a top view of a fuel cell according to a particularly preferred second embodiment of the invention. This configuration is very similar to the configuration of FIG. 1a with the difference that the receiving absorbent region (11) comprises two receiving absorbent sub-regions, identified as (11a) and (11b) which are separated from each and located in the same physical support. In the first receiving absorbent sub-region (11a) can deposited a catholyte fluid, giving rise to reduced species to interact with the cathodic zone (13), and in the second receiving absorbent sub-region (11b) can be deposited anolyte fluid comprising oxidizing species that can interact with the anodic zone (14). Alternatively, the first receiving absorbent sub-region (11a) may comprise an oxidizing substance previously immobilized in an area of the first receiving absorbent sub-region (11a) and the second receiving absorbent sub-region (11b) may comprise a reductive substance previously immobilized in an area of the second receiving absorbent sub-region (11b). Then, immobilized oxidizing and reducing substances can be solubilized for example by the addition of an external liquid, preferably an aqueous liquid.

In the embodiment of FIG. 1b, the microfluidic channel (10) comprises two branches (18), so that the receiving absorbent sub-region (11a) is coupled to the microfluidic channel (10) through one of these branches (18) and the second receiving absorbent sub-region (11b) is coupled to the microfluidic channel (10) through a second of said branches (18). Said first branch and the cathodic zone (13) are arranged substantially on the same side of the microfluidic channel (10), so that the cathodic zone (13) can substantially interact completely with the catholyte fluid when it flows through the microfluidic channel (10). Equivalently, the second branch and the anodic zone (14) are arranged substantially on the same side of the microfluidic channel (10), so that the anodic zone (14) can substantially interact completely with anolyte fluid when it flows through the microfluidic channel (10). More details about the flows of the catholyte and anolyte fluids are described later.

The configuration described in the previous paragraph implies a relative positioning between the first receiving absorbent sub-region (11a) and the cathodic zone (13), and between the second receiving absorbent sub-region (11b) and the anodic zone (14), which allows the production of electrochemical energy more efficiently than in the embodiment of FIG. 1a. In fact, with this preferred configuration of the fuel cell of the present invention can be obtained a "clean" interaction between the catholyte fluid comprising at least one reducing species and the cathodic zone (13), and a "clean" interaction between the anolyte fluid comprising at least one oxidizing species and the anodic zone (14), and consequently the fuel cell is more efficient.

In this regard, FIG. 3a shows the configuration of a microfluidic channel (10), a cathodic zone (13) and an anodic zone (14) similar to the one comprised in the fuel cell shown in FIG. 1b. FIG. 3a also shows how a catholyte fluid (31) and an anolyte fluid (30) can flow through the microfluidic channel (10). Particularly, the catholyte fluid (31), which comprises reducing species, can flow so that it can achieve a substantially complete interaction between this and the cathode(s) contained in the cathodic zone (13). Equivalently, the anolyte fluid (30), which comprises oxidizing species can flow so that it can achieve a substantially complete interaction between this and the anode(s) contained in the anodic zone (14).

FIG. 3a also shows how, in this particularly preferred embodiment, the catholyte fluid (31) and the anolyte fluid (30) can start to mix after advancing a certain distance, forming an area called diffusion zone (32). In this especially preferred embodiment of the invention, the cathodic zone (13) and the anodic zone (14) are positioned in the microfluidic channel (10) at a distance sufficiently short with respect to the end where the receiving absorbent sub-regions (11a) and (11b) are coupled to prevent that the diffusion zone

(32) comes into contact with any one of the cathodes comprised in the cathodic zone (13), with any one of the anodes comprised in the anodic zone (14), or both. Thus, although the catholyte fluid (31) and the anolyte fluid (30) can be finally mixed, in this particularly preferred embodiment it is ensured an interaction between the fluid completely catholyte (31) and the cathodic zone (13), and between the fluid completely anolyte (30) and the anodic zone (14).

FIG. 3b is a schematic representation of a 3D microfluidic channel (10) and the configuration of the cathodic zone (13) and the anodic zone (14) in accordance with another particularly preferred embodiment of the invention. This configuration is an alternative to the configuration shown in FIGS. 1b and 3a. In this case, the first and second receiving absorbent sub-regions (11a), (11b), not shown in FIG. 3b, are arranged so that the flow of catholyte fluid (31) is achieved substantially above the flow of anolyte fluid (30). Accordingly, the cathodic zone (13) is disposed in an upper region of the microfluidic channel (10) and the anodic zone (14) is disposed in a lower region of the microfluidic channel (10). This configuration of FIG. 3b allows the generation of electrochemical energy substantially equal to the configuration of FIGS. 1b and 3a.

Figure 1C:
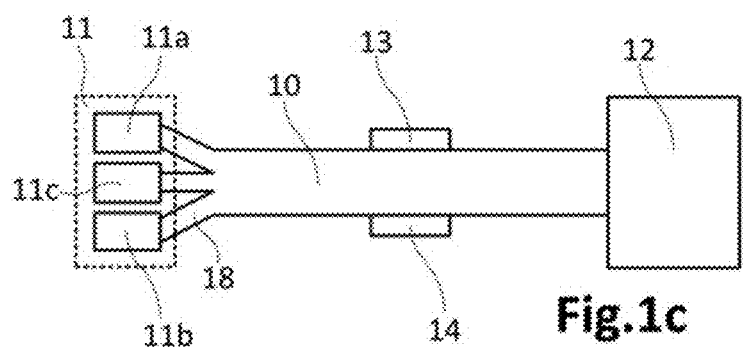
FIG. 1c: Schematic representation of a top view of a fuel cell according to a third preferred embodiment of the invention.

FIG. 1c is a schematic representation of a top view of a fuel cell according to another especially preferred embodiment of the invention. In this case, the difference from the fuel cell shown in FIG. 1b is that this especially preferred embodiment further comprises a third receiving absorbent sub-region (11c) separated from the first and second receiving absorbent sub-regions (11a) and (11b). In this third absorbent sub-region (11c) can be deposited an electrolyte fluid, and may be disposed in relation to the first and second absorbent sub-regions (11a) and (11b) so that the electrolyte fluid maintains at least partially, the catholyte fluid (31) and the anolyte fluid (30) separate as they flow through the microfluidic channel (10) by capillarity.

In the especially preferred embodiment of FIG. 1c, the mixture catholyte fluid (31) and the anolyte fluid (30) can be delayed with respect to the mixture which is produced in the configurations of FIGS. 1b, 3a and 3b. In this regard, FIG. 3c shows how in this especially preferable embodiment, an electrolyte fluid (33) flowing between the catholyte fluid (31) and the anolyte fluid (30) to delay the mixing of the catholyte fluid (31) and the anolyte fluid (30). The area (34) refers to the mixture of catholyte fluid (31) with the electrolyte fluid (33). The area (35) refers to the mixture of anolyte fluid (30) with the electrolyte fluid (33). It is clearly seen that with the "intermediate" flow of electrolyte fluid (33), the diffusion zone (32) which represents the mixture of catholyte (31) and anolyte (30) fluids which appears later than in the embodiments without such "intermediate" flow of fluid electrolyte (33).

In any of the above described embodiments, the microfluidic channel (10) as well as any of the absorbent regions (11) and (12), can be made of a paper based material, such as for example filter paper, paper silk, cellulose paper, writing paper, etc. Alternatively, they may be made of other suitable materials such as e.g. nitrocellulose acetate, textiles, polymeric layers, etc. Paper-based materials suppose a low cost, so the microfluidic channel (10) and receiving and collecting absorbent regions, (11) and (12) respectively, are preferably made of such type of material. In addition, paper is a completely biodegradable material. Therefore, paper contributes to obtaining a cheap and biodegradable fuel cell.

Furthermore, the microfluidic channel (10), as well as any of the receiving or collecting regions comprising paper as a main material, can be obtained by two different methods, or a combination thereof. The first method involves cutting the paper into the desired shape so that the resulting structure corresponds to the microfluidic channel. The cutting can be performed by mechanical action, for example, using scissors, knives or automatic equipment such as a plotter cutter, or using a laser, etc. The second method involves defining hydrophobic areas within the total surface of the porous material, preferably paper. The definition of hydrophobic areas can be accomplished by impregnating the porous matrix with photoresist, wax, teflon, hydrophobic chemicals, etc., or applying a chemical treatment to modify the wetting properties.

Figure 1D:
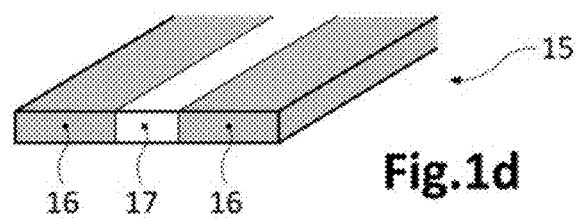
FIG. 1d: Schematic representation of a 3D paper sheet having a microfluidic channel in accordance with preferred embodiments of the invention.

FIG. 1d is a schematic representation of a 3D paper sheet having a microfluidic channel suitable for the embodiments of the invention. The microfluidic channel has been achieved by defining hydrophobic areas (16) that define, in turn, a hydrophilic zone (paper) (17) which constitutes the desired microfluidic channel. The hydrophobic areas (16) can be obtained for example by applying any of the techniques discussed above.

Preferably, cutting is applied to obtain the microfluidic channel (10) and receiving and collecting absorbent regions, (11) and (12) respectively, because cutting a priori is cheaper than other types of methods, such as for example the techniques discussed above based on the definition of hydrophobic areas.

Figure 2A:
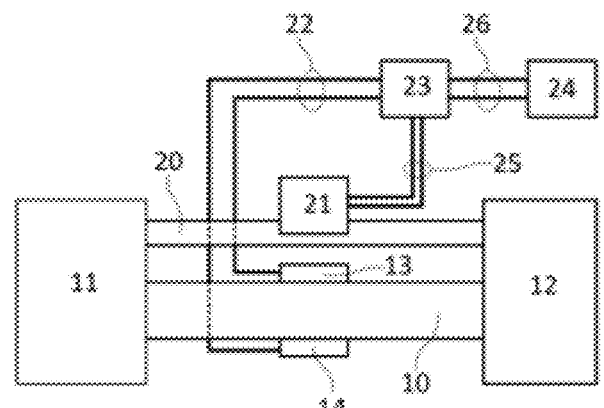
FIG. 2a: Schematic representation of a top view of a lateral flow test strip according to preferred embodiments of the invention.

FIG. 2a is a schematic representation of a top view of a lateral flow test strip according to especially preferred embodiments of the invention. This test strip comprising the fuel cell described above and schematized in FIG. 1a. This test strip also comprises an analysis microfluidic channel (20) connected to the receiving absorbent region (11) at one end of the channel (20), and the collecting absorbent region (12) at the opposite end of channel (20). Thus, in this especially preferred embodiment of the present invention, the receiving absorbent region of the analysis microfluidic channel (20) is the same as the receiving absorbent region of the fuel cell, and the collecting absorbent region of the analysis microfluidic channel is the same as the collecting absorbent region of the fuel cell. The features described in relation to FIG. 1a with respect to the receiving absorbent region (11) and to the microfluidic channel (10) are also applicable to this preferred embodiment of the test strip of the invention. Therefore, this especially preferred configuration can also allow a continuous flow of fluid from the receiving absorbent region (11) to the collecting absorbent region (12), where the fluid is absorbed allowing the continuation of the flow by capillarity when the analysis microfluidic channel (20) is saturated.

Alternatively to the especially preferred embodiment described above, the test strip of the present invention may comprise a receiving absorbent region and a collecting absorbent region, connected to opposite ends of the analysis microfluidic channel (20), being these absorbent regions separated from receiving (11) and collecting (12) absorbent regions coupled to the microfluidic channel (10) which form part of the fuel cell comprised in the test strip of the invention.

In an especially preferred embodiment of the present invention as shown in FIG. 2a, the test strip of the present invention comprises a detection zone (21) having at least one electrochemical sensor coupled to the analysis microfluidic channel (20), so that the electrochemical sensor may interact with the sample to be tested, preferably a biological sample, when it flows by capillary through analysis microfluidic channel (20). Such interaction, in combination with appropriate electrical input signals, can produce corresponding electrical output signals representing the results of the test. Electrochemical sensors can be based on carbon electrodes, said material contributes to the biodegradability of the test strip.

This test strip can also comprise an electronic circuit (23), a display system (24), preferably a screen, and a plurality of conductive tracks (22), (25) and (26) that connect the electronic circuit (23) with the anodic zone (14) and the cathodic zone (13) of the fuel cell, with the detection zone (21), and with the display system (24). The electronic circuit (23) may be a silicon-based microelectronic circuit. Additionally, the display system (24) can be a screen printed in paper, for example, based on suitable polymers. Additionally, the conductive tracks (22), (25) and (26) may be made of carbon. These features can make the test strip highly biodegradable. As an alternative to carbon, the conductive tracks (22), (25) and (26) may be made of conductive polymers, metals such as copper or gold metals, or any combination thereof.

Conductive tracks (22) that connect the electronic circuit (23) with the anodic zone (14) and the cathodic zone (13) of the fuel cell allow the electronic circuit (23) to receive electricity from the fuel cell. Conductive tracks (25) that connect the electronic circuit (23) with electrochemical sensors included in the detection zone (21) allow the electronic circuit (23) to provide adequate electrical input signals to the electrochemical sensors (21). The electronic circuit (23) can get these electrical input signals, necessary for electrochemical sensors (21) to properly interact with the sample to analyze, from the electricity produced by the fuel cell according to an implemented logic. This interaction of electrochemical sensors (21) with the sample, preferably biologic, and the appropriate electrical input signals can produce electrical output signals representing the results of the analysis. Sensors within the detection zone (21) can send these electrical output signals to the electronic circuit (23) through the corresponding conductive tracks (25). The electronic circuit (23) can convert, according to an implemented logic, these electrical output signals into electrical signals that can be visualized and sends them to the display system (24) through the corresponding conductive track (26).

The test strip of the present invention may further comprise a pre-treatment region, not shown in FIG. 2a, which can be coupled to the microfluidic channel of the fuel cell (10) at a point between the receiving absorbent region (11) and the cathodic (13) or anodic (14) zones. Additionally, this pre-treatment region may also be incorporated into the microfluidic channel analysis (20), at a point between the receiving absorbent region of the sample (11) and the detection zone (21). This pre-treatment region may have a configuration suitable for carrying out different types of pretreatments such as filtering, separation, screening of the liquid(s) that may flow through the microfluidic channel of the fuel cell (10) and/or analysis microfluidic channel (20). To design and/or build this region known principles of pre-treatment can be used, such as those described in patent applications WO 2009121041 A2 (A. Siegel et al) and WO 2011087813 A2 (P. Yager et al).

Figure 2B:
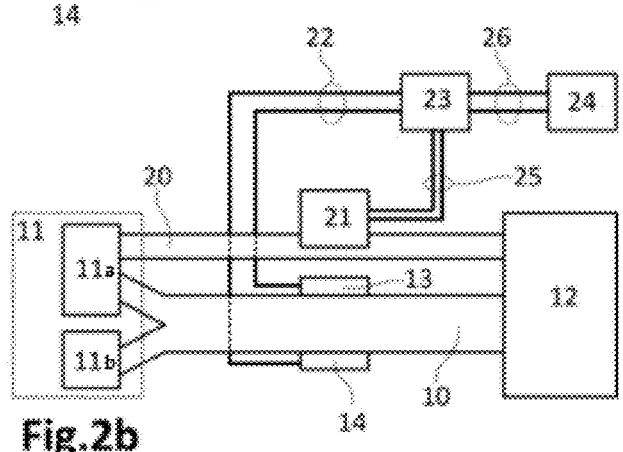
FIG. 2b: Schematic representation of a top view of a lateral flow test strip in accordance with other preferred embodiments of the invention.

FIG. 2b is a schematic representation of a top view of a lateral flow test strip in accordance with other particularly preferred embodiments of the invention. This test strip is very similar to the strip shown in FIG. 2a, with the difference that the strip of FIG. 2b includes a fuel cell of the type described with reference to FIG. 1b, while the strip FIG. 2a comprises a fuel cell of the type shown in FIG. 1a.

Figure 2C:
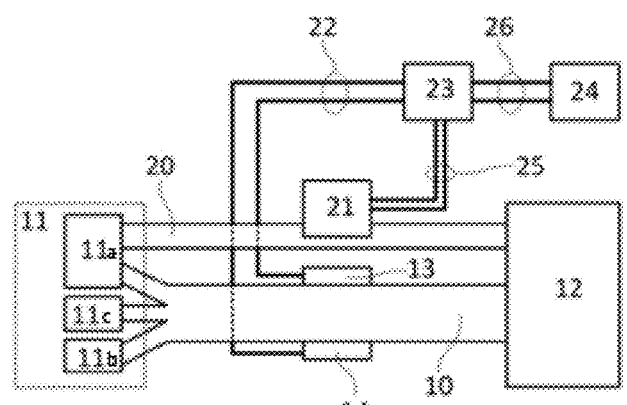
FIG. 2c: Schematic representation of a top view of a lateral flow test strip in accordance with other preferred embodiments of the invention.

FIG. 2c is a schematic representation of a top view of a lateral flow test strip in accordance with other particularly preferred embodiments of the invention. This test strip is very similar to the strip shown in FIG. 2b, with the only difference that the strip of FIG. 2c comprises a fuel cell of the type described with reference to FIG. 1c, while the strip FIG. 2b comprises a fuel cell of the type shown in FIG. 1b.

An important aspect of the strips illustrated in FIGS. 2a, 2b and 2c is that the same fluid can be used as a suitable fluid to generate electricity by the fuel cell, and as the sample to analyze in the detection zone (21). This fluid can be a biological sample, such as, for example, urine, blood, blood plasma, saliva, semen, sweat, etc. In this way, this strip may be a completely stand-alone test strip, and therefore, operate without connection to external electrochemical sensor, display system or electronic circuit.

In some embodiments of the test strip described in this patent application, the detection zone (21) has the function of measuring or detecting specific compounds in the sample, preferably biologically, to analyze. Detection can be based on different techniques such as electrochemical, optical, etc. Additional stages of pre-treating the sample, and the regions needed for these steps to take place in the strip can be included before the sample reaches the detection zone (21).

An electrochemical sensor can be manufactured for example by deposition of one or more electrodes, which may be made of carbon in a porous matrix which may be made of paper based materials. One of these electrodes can be defined as a reference electrode, at least one of these electrodes as a counter electrode, and at least one more of these electrodes as a working electrode. Electrode deposition may be accomplished by various techniques such as sputtering, evaporation, spray coating or printing techniques such as ink jet, gravure, offset, flexographic or screen printing. The electrodes can be functionalized to enhance detection capabilities. The functionalization of the electrodes may be formed by deposition of an active material, chemical treatment, etc.

For designing and constructing the detection zone (21) can be used suitable known principles known to one skilled in the art, for example, those disclosed in *Patterned paper substrates and as alternative materials for low-cost microfluidic diagnostics*, David R. Ballerini, Xu Li and Shen Wei. Microfluidics and Nanofluidics. 2012, DOI: 10.1007/s10404-012-0999-2.

The electronic circuit (23) may correspond to an electronic circuit that can perform various tasks related to the test results to be produced. The circuit may comprise a combination of discrete electronic components and/or integrated circuits. Some embodiments may use, for example, a full custom application specific integrated circuit (ASIC) for performance improvement and reduction of area.

The circuit may comprise several blocks such as power management, instrumentation, communications, data logging, etc. The power management block may take the energy produced by the fuel cell and increase the voltage to power the block instrumentation. The instrumentation block can supply power to the sensors included in the detection zone (21) for performing the measurement, monitor the signal(s) of the sensors and compare them with reference values. The result(s) of the measurement(s) can be sent to the display system (24).

The electronic circuit (23) may further comprise a data logger to store the information collected from the sensors within the detection zone (21). Furthermore, the electronic circuit (23) may further comprise a communication module to send the result(s) of the measurement(s) by radiofrequency, e.g. to an external receiver.

For designing and constructing the electronic circuit (23), preferably when it is a microelectronic circuit, can be used suitable known principles known to one skilled in the art, for example, those disclosed in J. Alley Bran, Larry R. Faulkner, "*Electrochemical Methods: Fundamentals and Applications*", John Wiley & Sons, 2001, ISBN 0-471-04372-9, Jordi Colomer-Farrarons, Pere Lluís Miribel-Català, "*A Self-Powered CMOS Front-End Architecture for Subcutaneous Event-Detection Devices: Three-Electrodes amperometric biosensor Approach*", Springer Science+Business Media BV, 2011, ISBN 978-94-007-0685-9.

The display system (24) may allow the test strip of the present invention to show a visual indication of the result of the measurement. This signal can be demonstrated by using a screen, for example electro-chromic, light emitting diode, LCD, etc. Some of these display systems are described in C G Granqvist, electrochromic devices, Journal of the European Ceramic Society, Volume 25, Issue 12, 2005, pages 2907-2912; Fundamentals of Liquid Crystal Devices, Author (s): Deng-Ke Yang, Shin-Tson Wu Published Online: 19 Oct. 2006, DOI: 10.1002/0470032030.

In a particular embodiment, the display of the results may be due to a change of color produced by an electrochemical composite absorbed in a porous matrix (eg, Prussian blue, etc.) comprised in the test strip.

The invention claimed is:

1. An analysis device for a liquid sample comprising:
  i) at least one fuel cell including:
    one microfluidic channel made of a wicking material with adequate porosity to allow capillary flow of at least one suitable fluid for generating electricity;
    at least one receiving absorbent region coupled to said microfluidic channel;
    at least one collecting absorbent region coupled to said microfluidic channel;
    a cathodic zone formed by at least a cathode coupled to said microfluidic channel; and
    an anodic zone formed by at least an anode coupled to said microfluidic channel,
  ii) at least one analysis microfluidic channel that allows a capillary flow of a liquid sample to analyse;
  iii) at least one receiving absorbent region coupled to said at least one analysis microfluidic channel;
  iv) at least one collecting absorbent region coupled to said at least one analysis microfluidic channel, and
  v) at least one detection zone having at least one sensor connected to said at least one analysis microfluidic channel,
wherein each receiving absorbent region and each collecting absorbent region are connected to the analysis microfluidic channel so that when a liquid sample is deposited in the receiving absorbent region it flows by capillary action through the analysis microfluidic channel to reach the collecting absorbent region where it is absorbed,
wherein the sensor interacts with the liquid sample to be tested, when said sample flows by capillary through the at least one analysis microfluidic channel, and
wherein the liquid sample is used as said suitable fluid to generate electricity by the fuel cell so that the analysis device is stand-alone.

2. The analysis device of claim 1, further comprising at least one conductive track connecting the anodic zone and the cathodic zone of any one of the fuel cells within the analysis device with at least one element selected from the group consisting of one electrochemical or optical sensor included in said detection zone, at least one display system to visualize the results of the analysis and at least one electronic circuit.

3. The analysis device according to claim 2, comprising:
  i) at least one electrochemical or optical sensor connected to each analysis microfluidic channel,
  ii) at least one display system to visualize the results of the analysis,
  iii) at least one electronic circuit, and
  iv) a plurality of conductive tracks that connect the at least one electronic circuit with the anodic zone and the cathodic zone of the fuel cell, with the detection zone including the at least one electrochemical or optical sensor, and with the at least one display system to visualize the results.

4. The analysis device according to claim 3, wherein the electrochemical sensor comprises carbon electrodes.

5. The analysis device according to claim 2, wherein at least one of the following: electrochemical sensors, electronic circuits, display system, are powered by the fuel cell.

6. The analysis device according to claim 2, wherein each electronic circuit is a silicon-based microelectronic circuit.

7. The analysis device according to claim 2 wherein each system to visualize the results of the analysis is a screen printed on paper.

8. The analysis device according to claim 2 wherein at least one conductive track is made of carbon.

9. The analysis device of claim 1, wherein the material of the microfluidic channels of the fuel cell is selected from the group consisting of paper, hydrophilic polymer, textile fiber, glass fiber, cellulose and nitrocellulose.

10. The analysis device of claim 1, wherein each of the regions receiving and collecting absorbers are made of a material selected from a paper based material, a fiber based material and a nitrocellullose based material.

11. The analysis device according to claim 1, wherein the receiving absorbent regions coupled to each analysis microfluidic channel are separated from one of the receiving absorbent regions comprised in one of the fuel cells.

12. The analysis device according to claim 1, wherein the collecting absorbent regions coupled to each analysis microfluidic channel are separated from one of the collecting absorbent regions comprised by one of the fuel cells.

13. The analysis device according to claim 1, wherein the analysis microfluidic channel is made of a material selected from the group of paper, hydrophilic polymer, textile fiber, glass fiber, cellulose and nitrocellulose.

14. The analysis device according to claim 1, wherein said sensor coupled to said at least one analysis microfluidic channel is an electrochemical or optical sensor.

* * * * *